United States Patent

[11] 3,612,781

[72] Inventors Donald J. Da Costa
Wappingers Falls, N.Y.;
Robert Y. Noguchi, Framingham, Mass.;
Leonard F. Winter, Poughkeepsie, N.Y.

[21] Appl. No. 844,528
[22] Filed July 24, 1969
[45] Patented Oct. 12, 1971
[73] Assignee International Business Machines Corporation
Armonk, N.Y.

[54] SIMULTANEOUS BIDIRECTIONAL TRANSMISSION SYSTEM
2 Claims, 4 Drawing Figs.

[52] U.S. Cl. .......... 179/170 NC
[51] Int. Cl. .......... H04m 1/58
[50] Field of Search .......... 179/170 NC, 81 A; 330/13, 69

[56] References Cited

UNITED STATES PATENTS

| | | | |
|---|---|---|---|
| 3,330,912 | 7/1967 | Koseki | 179/81 A |
| 3,453,395 | 7/1969 | Englund | 179/81 A |
| 3,530,260 | 9/1970 | Gaunt | 179/170 NAC |

*Primary Examiner*—Kathleen H. Claffy
*Assistant Examiner*—William A. Helvestine
*Attorneys*—Hanifin and Jancin and James E. Murray

ABSTRACT: This specification describes a circuit which permits the simultaneous transmission of data in two directions on a common transmission line without the use of frequency or time discrimination. The circuit includes at each location a differential amplifier with two inputs, one input receives data to be transmitted onto the line from the particular location and the other input receives both the data being transmitted onto the line from the location and the data being received on the line at the location. The two inputs are isolated from each other so that the output of the differential amplifier which goes to the location receiver is a function only of the data received on the line at the location.

INVENTORS
DONALD J. DACOSTA
LEONARD F. WINTER
ROBERT Y. NOGUCHI
BY James E. Murray
ATTORNEY

SIMULTANEOUS BIDIRECTIONAL TRANSMISSION SYSTEM

BACKGROUND OF THE INVENTION

This invention relates to data transmission and more particularly to the transmission of signals in two directions on a single transmission line without the use of frequency or time discrimation. As computers have become more and more complex the number of interconnections between the various parts of the computers has increased rapidly. This has resulted in large cable arrays interconnecting various parts of computer systems. These cable arrays are cumbersome, difficult to work with and unsightly. Therefore any reduction in the number of interconnections that must be made is desirable.

In accordance with the present invention the number of cables is reduced by transmitting data in two directions on single cable without frequency or time discrimination. For this purpose there is located at each location a differential amplifier which has two inputs. One of the inputs receives the data being transmitted out onto the line. The other of the inputs receives the data being transmitted to the location on the line and also receives the data being transmitted out onto the line from the location. The output of the differential amplifier goes to the receiver. Since the data being transmitted out onto the line is sent to both sides of the differential amplifier it is cancelled out in the output so that only data being received from the transmission line appears in the output signal.

Therefore, it is an object of the present invention to provide a system for the transmission of data in two directions on a single transmission line.

It is another object of the present invention to provide transmission in two directions on a single transmission line without the use of out of phase and frequency discrimation.

It is another object of this invention to provide a system for the transmission of data in two directions which is compatible with the computer logic circuits.

Another object of the invention is to provide a system for transmission of data on the single transmission line which has a minimum effect on the characteristic impedance of the line and whose output is least affected by the characteristic impedance of the transmission line.

It is still another object of the invention to provide a circuit which makes use of component matching so that it performs well when fabricated in monolithic form.

DESCRIPTION OF THE DRAWINGS

The foregoing and other objects, features and advantages of the invention will be apparent from the following more particular description of the preferred embodiment of the invention as illustrated in the accompanying drawings of which:

Referring to FIG. 1, transmission line 10 is terminated at both its ends in its characteristic impedance Z0. At each end also is located a driver D1 or D*m* and a receiver R1 or R*m*. At a number of locations along the length of the transmission line 10 are located other drivers and receivers D2 through Dm–1 and R2 through R*m*–1.

In accordance with the present invention data can be sent from any one of the mentioned end or intermediate locations to any other location while data is being simultaneously received at the sending location. This is accomplished by use of the circuits shown in FIGS. 2 and 3.

Figure 2:
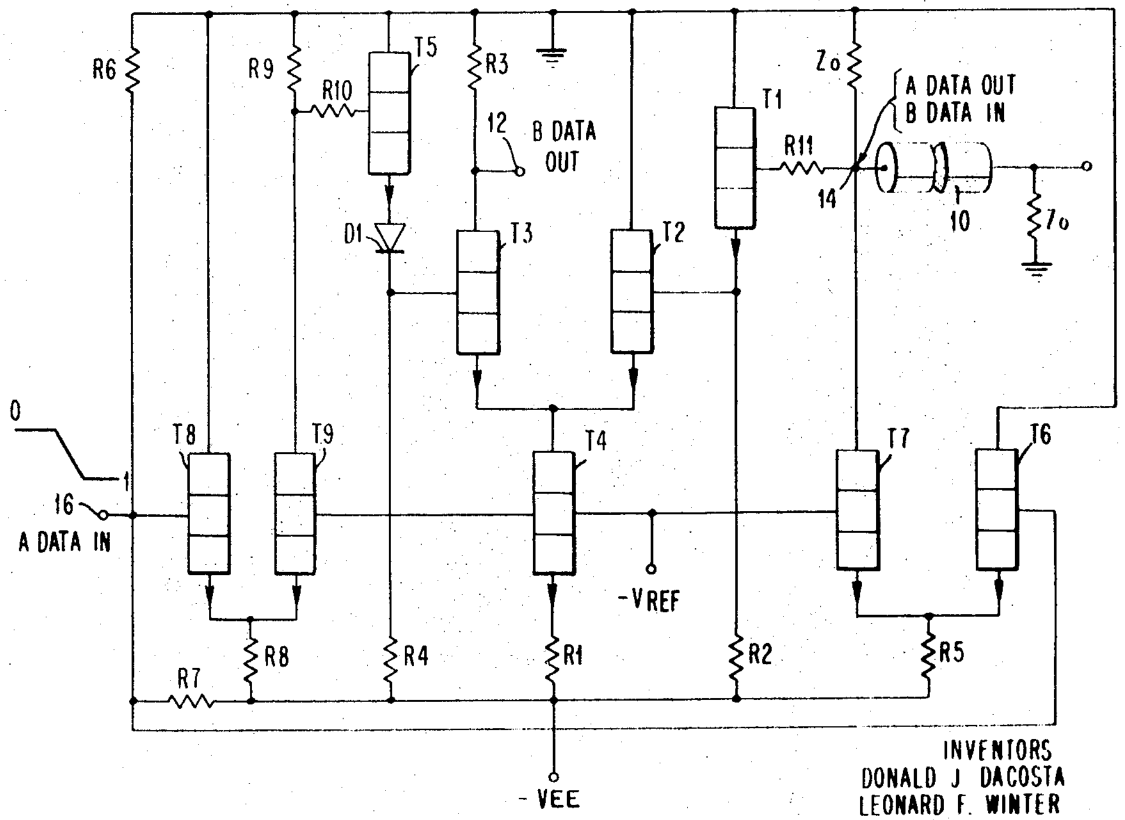
FIG. 2 is an illustration of a circuit in accordance with the present invention for the receipt and transmission of data onto a transmission line.

Referring to FIG. 2, transistors T2, T3 and T4 form a current switch. In this current switch, the collector current of transistor T4 either passes through transistor T2 or T3 depending on the relative magnitudes of base potentials of transistors T2 and T3. Thus when the potential at the base of transistor T2 is higher than that at the base of transistor T3, transistor T2 conducts and transistor T3 is cut off giving an up output signal at the output terminal 12. However, when the potential at the base of transistor T3 is higher than at the base of transistor T2, transistor T3 conducts developing a potential drop across resistor R3 and giving a down output signal at the terminal 12.

The bases of transistors T2 and T3 are each connected to a voltage divider. In the case of transistor T2 this voltage divider consists of transistor T1 and resistor R2 and in the case of transistor T3 it consists of transistor T5, resistor R4 and diode D1. With no inputs to the circuit the potential at the base of transistor T3 is lower than the potential at the base of transistor T2 because of the additional diode drop caused by diode D1. Therefore, transistor T3 is normally off. However, when data is transmitted on the line 10 to input terminal 14 resistor R11 couples the data signal to the base of transistor T1. The data signal is a down signal causing the potential at the base of transistor T1 to drop which in turn drops the potential at the base of transistor T2 below the potential at the base of transistor T3. This causes transistor T3 to conduct and give a down output signal at the terminal 12. Therefore a down output signal at the terminal 12 indicates that data is being received on the line 10 while an up output signal at terminal 12 indicates there is no data being received on the line 10.

Data being sent out from the location is put on the transmission line at terminal 14. The data to be fed out onto the line 10 is fed to terminal 16. Terminal 16 is connected to a differential circuit consisting of transistors T6 and T7, and resistor R5. The base of transistor T7 is attached to a fixed reference potential –Vref while the base of transistor T6 is attached to the terminal 16 for the receipt of the data to be sent out on the transmission line 10. Terminal 16 is biased by a voltage divider consisting of resistors R6 and R7. These resistors maintain the terminal 16 at a higher potential than –Vref while no data is being transmitted to the circuit. Therefore transistor T6 conducts to the exclusion of transistor T7 while no data is to be transmitted to the transmission line 10. However, when data is received on terminal 16 the potential at the base of transistor T6 is lowered by such data so that it is then lower than –Vref. This biases transistor T6 off and transistor T7 conducting so that there is a down signal at the terminal 12.

It can be seen that both the data received at terminal 14 from the line 10 and the data being sent out on the transmission line 10 from terminal 14 are down signals. Both the incoming and outgoing signals would then have the same effect on the output 12 of the circuit. That is, both would cause the output 12 to go from an up level to a down level and if no further signals were present it would mean that a receiver attached to the output 12 would not be able to distinguish between the data being sent out on the line from the location and the data being received on the line at the location since both are down signals.

In accordance with the present invention this difficulty is overcome by causing the base of transistor T3 to vary with the signals being sent out on the line in the same manner as the base of transistor T2 varies with such signals and at the same time isolating the base of transistor T3 from the data being received on the line at terminal 14. Therefore the data being sent out on the line will be cancelled out by the differential switch consisting of transistors T2 and T3 while the data being transmitted from the line will be unaffected by such cancellation and sent on to the output where it can be detected by a receiver. This is accomplished by the use of an additional differential switch consisting of transistors T8 and T9 and resistor R8. This differential switch is identical to the differential switch consisting of transistors T7 and T6 and the load for transistor T9 is resistors R9 and R10 which are identical, respectively, to resistors Z0 and R1. Therefore, as long as there is no data being received at terminal 16, transistor T8 conducts like transistor T6 because its base is at a higher potential than transistor T9. However, when an input signal is received at the terminal 16 the base of transistor T8 is reduced below −Vref so that transistor T9 conducts causing a drop in potential across resistor R9 which is transmitted through resistor R10 to the base of transistor T5 causing transistor T5 to conduct less and lowering the voltage at the base of transistor T3 in the same amount as the base of transistor T2 is lowered by the voltage across resistor Z0 due to the conduction of transistor T7. Therefore the data input signals are cancelled out by the differential amplifier T3 and T2 and only data being transmitted to the location from the line 10 is evidenced at the output 12.

Figure 1:
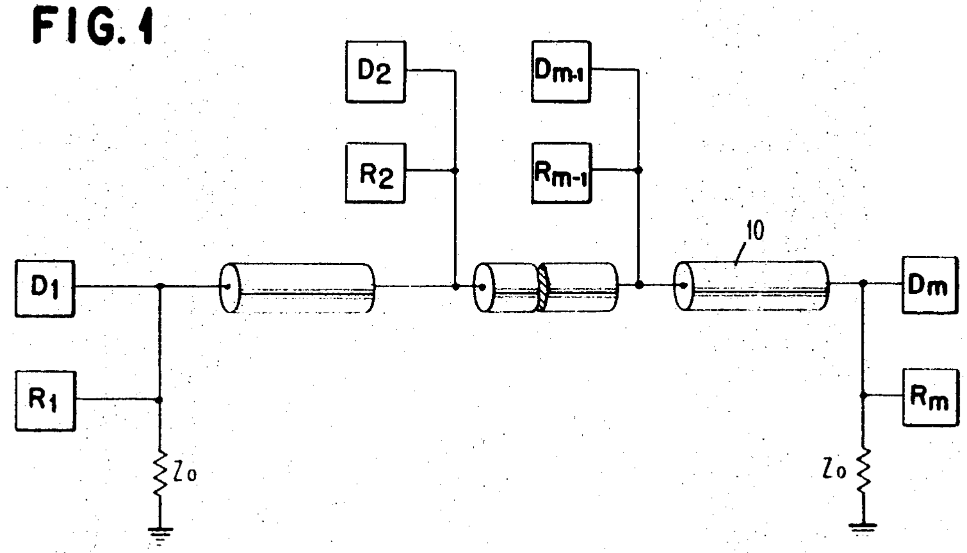
FIG. 1 shows an arrangement of receivers and drivers for the simultaneous transmission of data to a number of locations on a transmission line.
Figure 4:
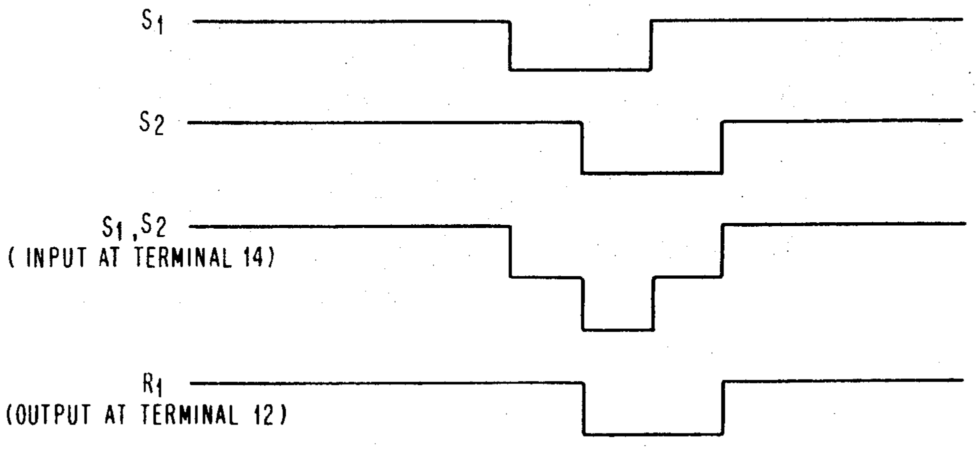
FIG. 4 is a circuit showing how signals are discriminated by the circuits of FIGS. 2 and 3.

Perhaps this could be better explained by reference to FIG. 4 simultaneously with the discussion of FIGS. 1 and 2. Assume that transmitter D1 is transmitting. This places a series of negative signals S1 at the data input terminal 16 causing transistors T9 and T7 to conduct whenever the terminal 14 goes negative. The conduction of transistors T9 and T7 cause identical voltage swings at their collectors and therefore at the bases of transistors T2 and T3. As a result there is no output change at the terminal 12 since the differential outputs of transistors T2 and T3 are sensitive only to differences between the voltage at their bases. Thus it can be seen that the output 12 is independent of signals transmitted from the terminal 14 to the line 10. However signals S2 coming in on the line 10 effects only the base of transistor T2 since it is isolated from the base of transistor T3. Therefore though the signals S1 and S2 may add at terminal 14 only the signal S2 is transmitted through the differential switch to the output terminal 12 since only it can cause a relative change in the potential at the bases of transistors T2 and T3.

Figure 3:
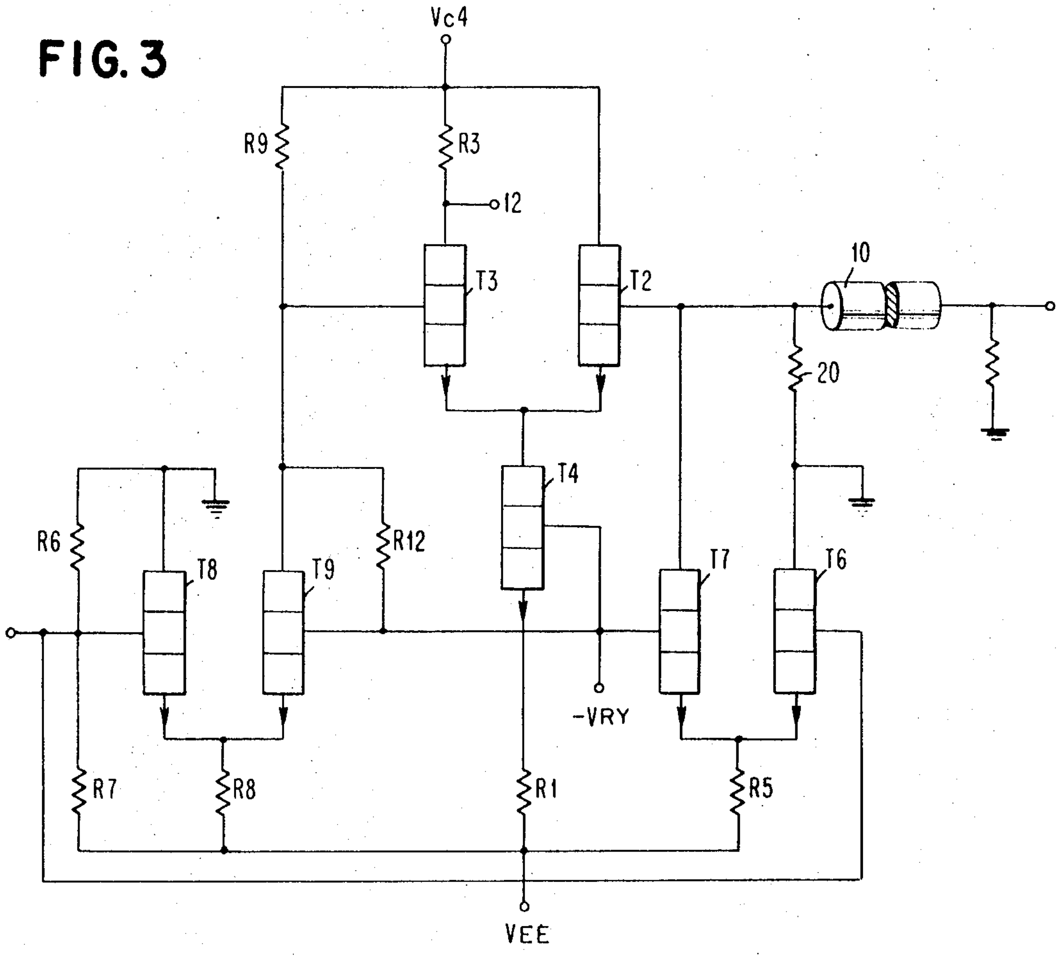
FIG. 3 is a second circuit for the receipt and transmission of data onto a transmission line.

The circuit of FIG. 3 is essentially that of FIG. 2. Transistor T2 through T4, T6 through T9, R1, R3, and R5 through R8 all perform identical functions. The differences between the circuit are as follows: The outputs of transistors T7 and T9 are fed directly to the bases of transistors T2 and T3. No emitter followers are used and in place of diode D1 resistors R12 and R9 perform two functions. One function is a voltage divider to develop a proper offset voltage in the base of transistor T3. The other is the function performed by resistor R9 in FIG. 2, that is to transmit the signals from the data input terminal to transistor T3.

So far we have talked about the terminating circuits for use with drivers D1 and D*m* and receivers R1 and R*m*. As for the intermediate drivers D2 through D*m*−1 and receivers R2 through R*m*−1 they are identical to the circuits so far described except that resistors Z0 in the described circuits are not a line terminating impedance. Instead it is an extremely high impedance so as to prevent line loading.

While the invention has been particularly shown and described with reference to preferred embodiments thereof, it will be understood by those skilled in the art that various changes in form and details may be made therein without departing from the spirit and scope of the invention.

What is claimed is:

1. A bidirectional transmission circuit comprising:

a. differential circuit means having an input terminal, a reference terminal and an output terminal, said differential circuit means including a differential amplifier having two transistors with their emitters coupled together to a constant current source, the base of the first of the two transistors coupled to the reference terminal, the base of the second of the transistors coupled to the input terminal and the collector of the first of the two transistors to the output terminal to provide an output signal at the output terminal indicative of the magnitude of the potential at the input terminal relative to the magnitude of the potential at the reference terminal;

b. transmission line means coupled to the input terminal to transmit data to the input terminal of the differential circuit means for comparison of said data to the potential at the reference terminal;

c. receiver means coupled to the output terminal for the reception of output signals from the differential circuit means;

d. sending means coupled to the transmission line means for the sending of information signals on the transmission line means and coupled to the reference terminal for changing the potential at the reference terminal as a function of the information signals so that the output of the differential circuit means does not change substantially with the information signals; and e. isolating means coupled between the transmission line means and the reference terminal to isolate the reference terminal from the data on the transmission line whereby the output of the differential circuit transmitted to the receiver means reflects only the data received on the transmission line means and not the information signals being placed on the transmission line means by the sending means.

2. The bidirectional transmission circuit of claim 1 wherein: said isolating means comprises two separate differential means each having a separate transistor with its collector coupled to the base of a different one of said two transistors, an input transistor coupled to a common current source with the separate transistor for the receipt of the information signals to be sent out on the transmission line whereby said separate transistors effect the bases of the two transistors in an identical manner so that said information signals do not effect the output of the circuit.